US012474143B2

(12) United States Patent
Rhode

(10) Patent No.: US 12,474,143 B2
(45) Date of Patent: Nov. 18, 2025

(54) ADJUSTMENT TOOL ASSEMBLY

(71) Applicant: New Revo Brand Group, LLC, Plymouth, MN (US)

(72) Inventor: Mike Rhode, Coon Rapids, MN (US)

(73) Assignee: New Revo Brand Group, LLC, Maple Groves, MN (US)

(*) Notice: Subject to any disclaimer, the term of this patent is extended or adjusted under 35 U.S.C. 154(b) by 84 days.

(21) Appl. No.: 18/474,387

(22) Filed: Sep. 26, 2023

(65) Prior Publication Data
US 2025/0102275 A1   Mar. 27, 2025

(51) Int. Cl.
*F41G 1/54* (2006.01)
(52) U.S. Cl.
CPC ................... *F41G 1/545* (2013.01)
(58) Field of Classification Search
CPC ............ F41G 1/545; B25G 1/08; B25G 1/085
See application file for complete search history.

(56) References Cited

U.S. PATENT DOCUMENTS

| | | | |
|---|---|---|---|
| 686,424 A * | 11/1901 | Smith ................. | B25B 23/0035 81/439 |
| 3,564,949 A * | 2/1971 | Hedrick ................... | F41G 1/16 81/461 |
| 5,481,807 A | 1/1996 | Ploot | |
| 5,966,825 A * | 10/1999 | Biemont ................. | F41G 1/545 42/136 |
| 6,186,036 B1 * | 2/2001 | Huang ................... | B25G 1/085 81/177.4 |
| 7,051,626 B1 * | 5/2006 | Chen ...................... | B25G 1/085 81/177.4 |
| 7,052,128 B1 * | 5/2006 | Kung-Ping ............. | B25B 15/02 81/439 |
| 7,255,028 B1 * | 8/2007 | Di Bitonto .............. | B25B 15/02 81/492 |
| 7,637,049 B1 | 12/2009 | Samson et al. | |
| 8,850,738 B2 | 10/2014 | Silver | |
| 9,127,899 B2 | 9/2015 | Shipman | |
| 10,112,292 B2 | 10/2018 | Keng | |
| 10,648,772 B2 | 5/2020 | Williams et al. | |
| D907,156 S | 1/2021 | Purnomohadi | |
| 11,236,968 B2 | 2/2022 | Jacobson | |
| 2010/0108562 A1 * | 5/2010 | Chen ...................... | B25G 1/085 206/349 |

(Continued)

OTHER PUBLICATIONS

Arsenal, Inc., Front Sight Elevation Wrench, https://www.arsenalinc.com/usa/elevation-wrench-tool.html, accessed Jun. 28, 2022.

(Continued)

*Primary Examiner* — Bret Hayes
(74) *Attorney, Agent, or Firm* — GRUMBLES LAW PLLC; Brittany Haanan

(57) ABSTRACT

An adjustment tool assembly for a firearm comprised of a double-sided adjuster tool and a housing having a handle. Each end of the double-sided adjuster tool can be comprised of a tool, each tool can have a shaft, and a middle portion can be positioned between the shaft of each tool end. The handle of the housing can have a receiving cavity for at least a portion of the double-sided adjuster tool, and the middle portion of the adjuster tool can engage with the receiving cavity to secure the adjuster tool to the handle.

20 Claims, 8 Drawing Sheets

(56) References Cited

U.S. PATENT DOCUMENTS

2011/0146464 A1* 6/2011 Hu .................... B25G 1/085
                                                                                   81/184

OTHER PUBLICATIONS

Brownells, AR-15/M16 Sight Wrenches, https://www.brownells.com/gunsmith-tools-supplies/sight-scope-installation-tools/sight-adjusting-tools/ar-15-m16-sight-wrenches-prod333.aspx, accessed Jun. 28, 2022.

HK Parts, HK Rear Sight Tool For Diopter Sights, https://hkparts.net/product/hk-rear-sight-tool-for-diopter-sights-p16511.htm/, accessed Jun. 28, 2022.

LWRCI, Sight Adjustment Tool, https://www.lwrci.com/LWRCI-Sight-Adjustment-Tool_p_60.html, accessed Jun. 28, 2022.

Otis Technology, M4 Sight Adjustment Tool 2 Pack, https://otistec.com/m4-sight-adjustment-tool-2-pack/, accessed Jun. 28, 2022.

Ridgedepot, HK Two PC Sight Adjustment Tool, https://ridgedepot.com/products/hk-two-pc-sight-adjustment-tool?variant_id=9982, Jun. 28, 2022.

Sadlak, A2 Front Sight Post .072 Adjustment tool, https://www.sadlak.com/product-page/a2-front-sight-post-270-adjustment-tool, accessed Jun. 28, 2022.

Sadlak, AR Store / M14 and AR Accessories, https://www.sadlak.com/ar-15-store?page=3, accessed Jun. 28, 2022.

Syncros, Greenslide 11CT Multi-Tool, https://www.syncros.com/us/en/product/syncros-greenslide-11ct-multi-tool, accessed Oct. 24, 2022.

The Country Shed, SKS & AK-47 Front Sight Elevation Tool, https://www.thecountryshed.com/Tapco-SKS-AK-47-Front-Sight-Elevation-Tool_p_259.html, accessed Jun. 28, 2022.

* cited by examiner

ADJUSTMENT TOOL ASSEMBLY

FIELD OF THE INVENTION

This disclosure relates to a firearm adjustment tool. More specifically, it relates to an adjustment tool assembly for adjusting components of a firearm, such as a rifle, and providing self-storage.

BACKGROUND OF THE INVENTION

To accurately use a firearm, it is important to ensure that its components, such as any sights on the firearm, are properly installed and calibrated. Some firearms have a front sight, such as an iron sight. An iron sight may be located on top of the firearm and may be calibrated using an A1 or an A2 sight adjuster. While these types of sights are well known in the industry, improvements are needed to make them easier to use and store.

SUMMARY OF THE INVENTION

The present disclosure relates to an adjustment tool assembly for adjusting a firearm, such as a rifle. In an illustrative but non-limiting example, the disclosure provides an adjustment tool assembly for a firearm that can include a double-sided adjuster tool and a housing having a handle. Each end of the double-sided adjuster tool can be comprised of a tool, each tool end of the double-sided adjuster tool can have a shaft, and a middle portion of the double-sided adjuster tool can be positioned between the shaft of each tool end. The handle of the housing can have a receiving cavity for at least a portion of the double-sided adjuster tool, and the middle portion of the adjuster tool can engage with the receiving cavity to secure the adjuster tool to the handle.

In some cases, at least one tool end of the adjuster tool can be comprised of an A1 adjuster having five prongs. In some cases, at least one tool end of the adjuster tool can be comprised of an A2 adjuster having four prongs. In some cases, the middle portion of the double-sided adjuster tool can be comprised of a central, hexagonal shaft, a channel on each end of the central, hexagonal shaft, and a stopper between each shaft and each channel.

In some cases, the receiving cavity can have a distal, open end with two flexible tabs, wherein each tab has a dimple near the distal end of the tab, and the dimples can be configured to interact with a channel in the middle portion of the adjuster tool to secure the adjuster tool to the handle. The middle portion of the adjuster tool can have a channel near the shaft of each tool end, and the dimples can be configured to interact with the channel near the tool end that is protruding out of the handle. The tabs can be on opposing sides of the receiving cavity. Further, the tabs can be on a top and bottom of the receiving cavity. The middle portion of the adjuster tool can be comprised of a central, hexagonal shaft and the receiving cavity can be correspondingly hexagonal in shape.

In some cases, the housing can be further comprised of a cover, the cover can have a snap-fit connection to the handle, and the handle and cover can completely encase the double-sided adjuster tool when connected. Further the handle can have a side wall on each of its right and left sides that includes an opening. In addition, the cover can have flexible fingers that align inside the side walls of the handle. Each finger can have a notch on its outer edge. Additionally, the notches can be configured to fit through the opening of the side walls to secure the cover to the handle.

In another illustrative but non-limiting example, the disclosure provides an adjustment tool assembly that can include a double-sided adjuster tool and a housing having a handle, a receiving cavity for at least a portion of the double-sided adjuster tool, and a cover configured to connect to the handle, wherein the handle and cover completely encase the double-sided adjuster tool. Each end of the double-sided adjuster tool can be comprised of a tool, at least one tool end can have sight adjuster prongs, the first and second tool ends can both have an adjacent shaft, and a middle portion can be positioned between the shaft of each tool end. The middle portion can be comprised of a central shaft, a channel on each end of the central shaft, and a stopper between each adjuster shaft and each channel. The receiving cavity of the housing can have a distal, open end with two flexible tabs, a dimple can be located on each tab near the distal end of the tab, and the dimples can be configured to interact with a channel in the middle portion of the adjuster tool to secure the adjuster tool to the handle.

In some cases, a first end of the adjuster tool can be comprised of an A2 adjuster having four prongs, and a second end of the adjuster tool can be comprised of an A1 adjuster having five prongs. In some cases, the handle can have a side wall on each of its right and left sides that includes an opening, the cover can have flexible fingers that align inside the side walls of the handle, each finger can have a notch on its outer edge, and the notches can be configured to fit through the opening of the side walls to secure the cover to the handle.

In another illustrative, but non-limiting example, the disclosure provides a method of assembling an adjustment tool assembly that can include inserting a double-sided adjuster tool into a receiving cavity of a handle; and securing a cover to the handle using a snap-fit connection. In some cases, the handle can have a side wall on each of its right and left sides that includes an opening, the cover can have flexible fingers that align inside the side walls of the handle, each flexible finger can have a notch on its outer edge, and the notches can be configured to fit through the opening of the side walls to secure the cover to the handle. Further, steps of assembly can include pushing the notches inward toward receiving cavity of the handle, thereby causing the flexible fingers to flex; and removing the cover from the handle.

DETAILED DESCRIPTION

Figure 1:
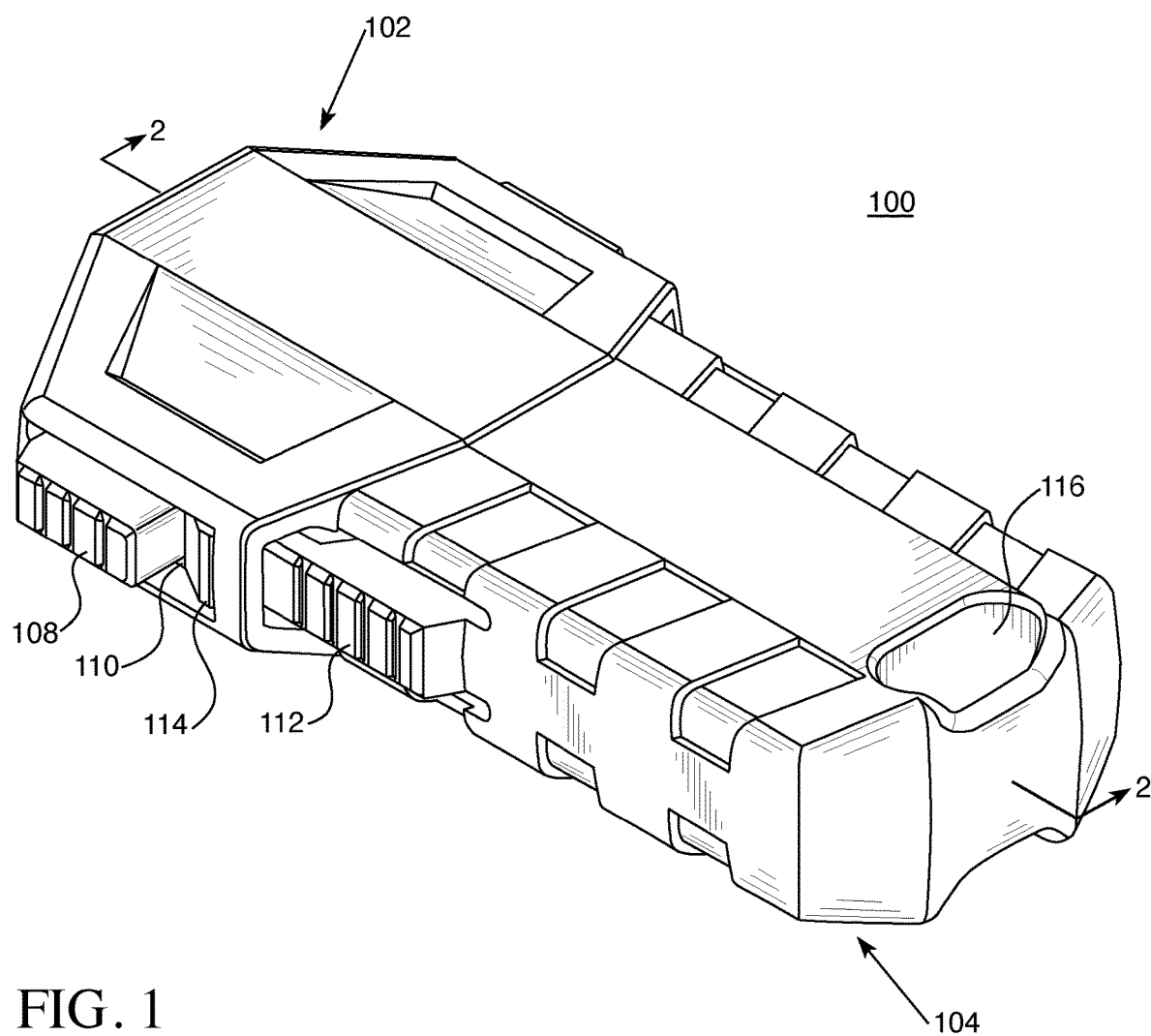
FIG. 1 is a perspective view of a housing of an adjustment tool assembly.

The present disclosure relates to an adjustment tool assembly that can be used to adjust portions of a firearm (such as the sight) and then stored within its own case. Various embodiments of the adjustment tool assembly will be described in detail with reference to the drawings, wherein like reference numerals represent like parts and assemblies throughout the several views. Reference to various embodiments does not limit the scope of the adjustment tool assembly disclosed herein. Additionally, any examples set forth in this specification are not intended to be limiting and merely set forth some of the many possible embodiments for the adjustment tool assembly. It is understood that various omissions and substitutions of equivalents are contemplated as circumstances may suggest or render expedient, but these are intended to cover applications or embodiments without departing from the spirit or scope of the disclosure. Also, it is to be understood that the phraseology and terminology used herein are for the purpose of description and should not be regarded as limiting.

Some embodiments of the adjustment tool assembly disclosed herein include features that allow a double-sided firearm adjustment tool to have a handle and be securely stored. More specifically, the adjustment tool assembly can include a double-sided adjuster tool and a housing having a handle. For storage, the housing can further include a cover that has a snap-fit connection to the handle so that the handle and cover can completely encase the double-sided adjuster tool when they are connected. Therefore, the adjustment tool assembly can have three main components: the handle, the adjustment tool, and the cover.

Figure 2:
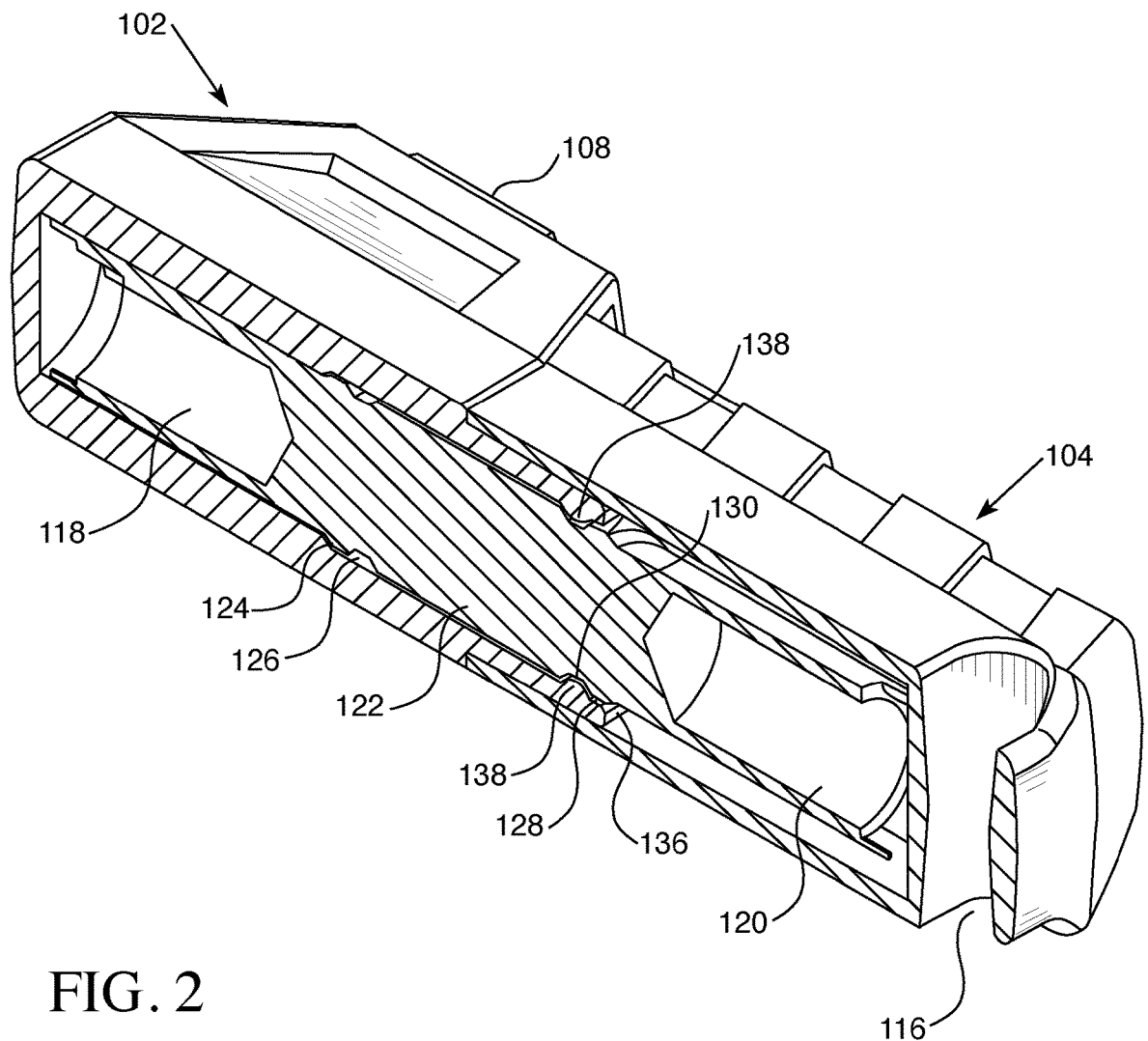
FIG. 2 is a cross-section view taken from line 2-2 of FIG. 1.
Figure 3:
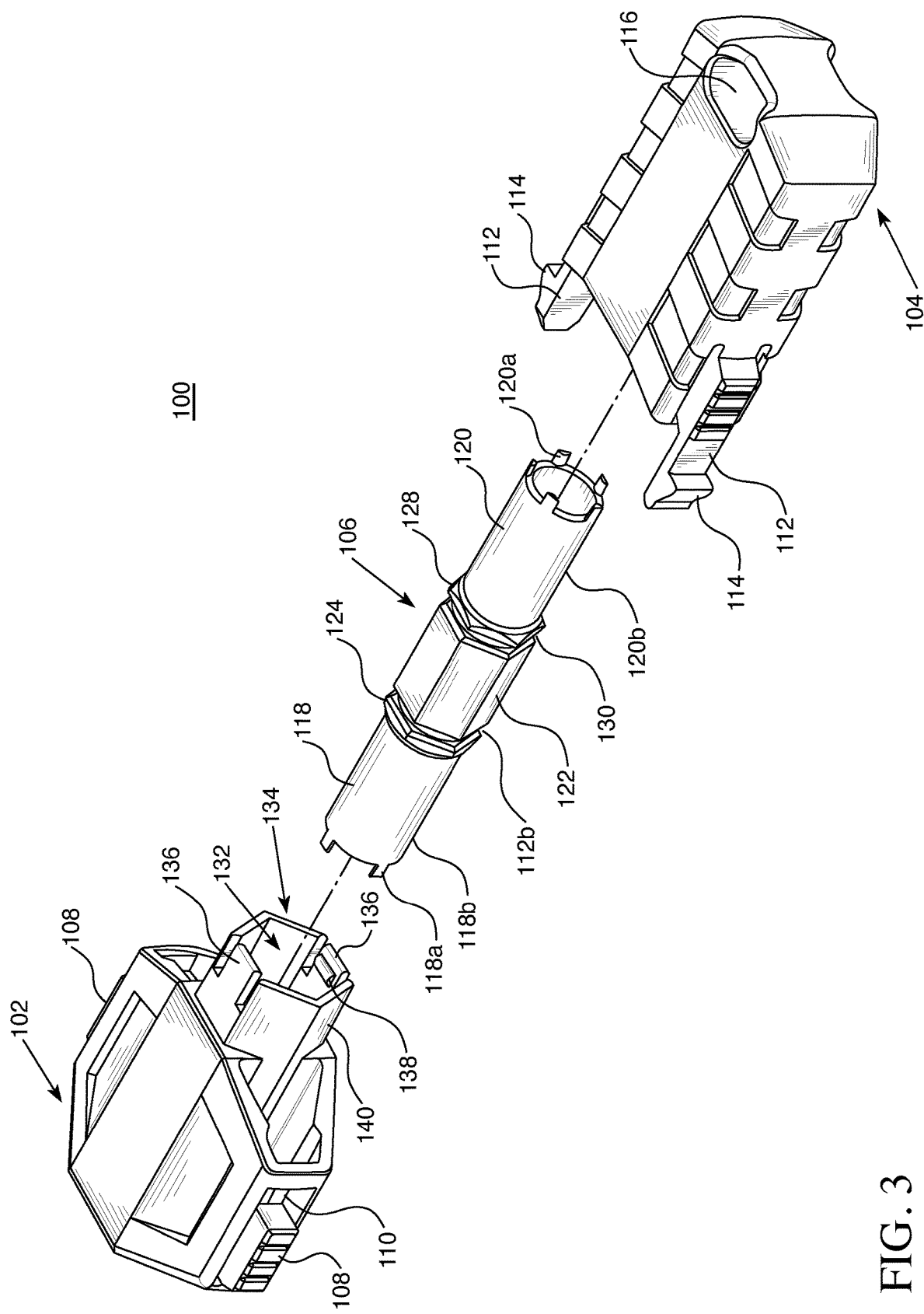
FIG. 3 is an exploded, top, perspective view of the adjustment tool assembly.
Figure 4:
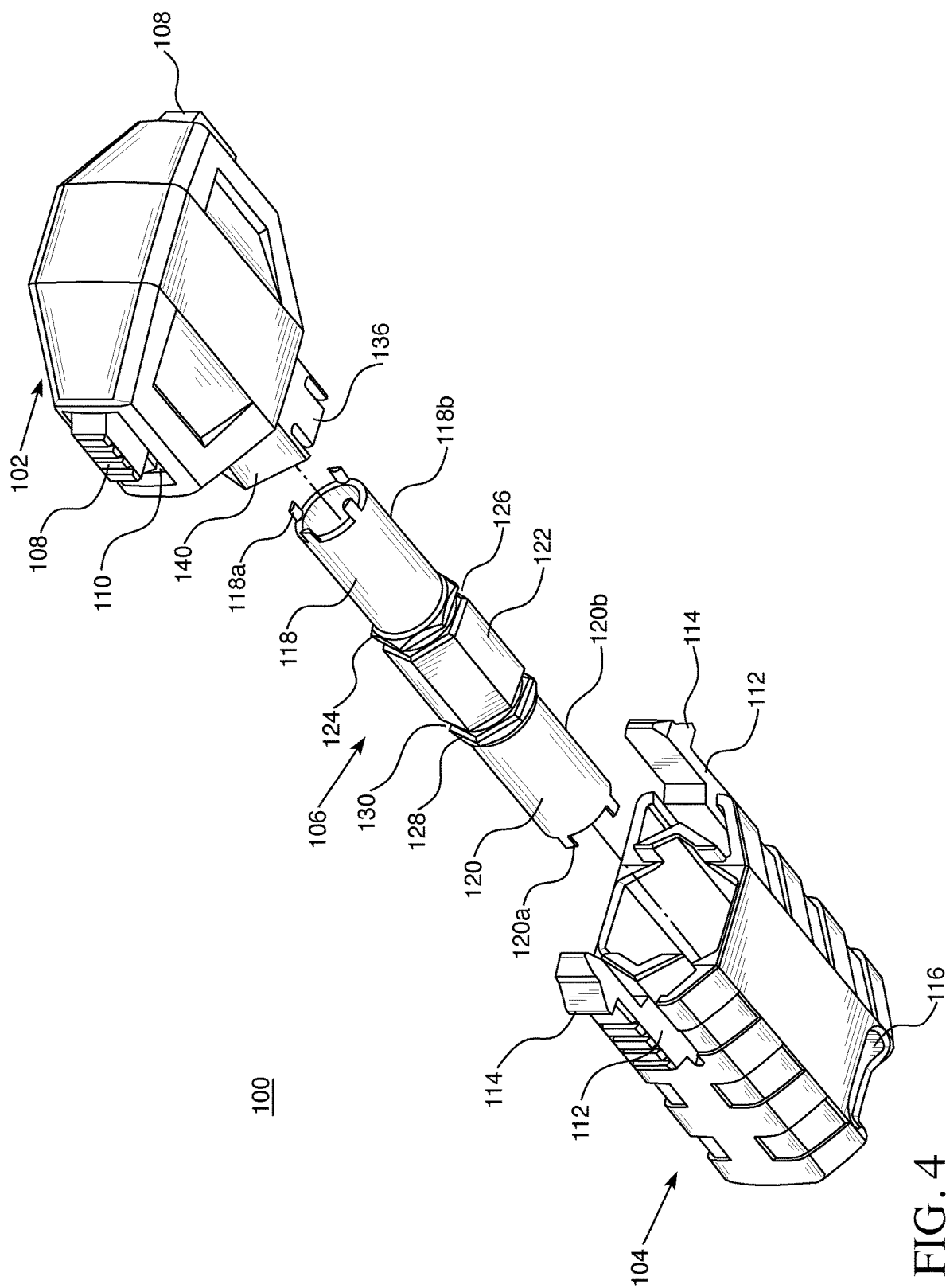
FIG. 4 is an exploded, bottom, perspective view of the adjustment tool assembly.
Figure 5:
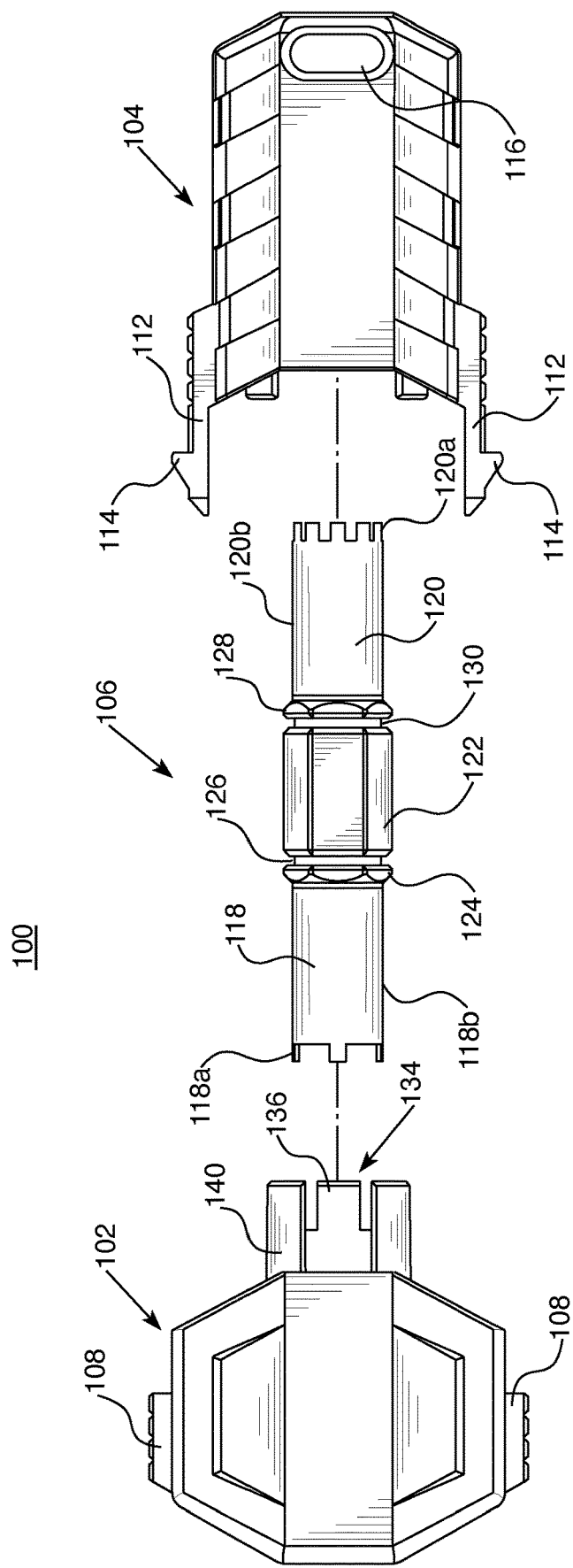
FIG. 5 is an exploded, top view of the adjustment tool assembly.
Figure 6:
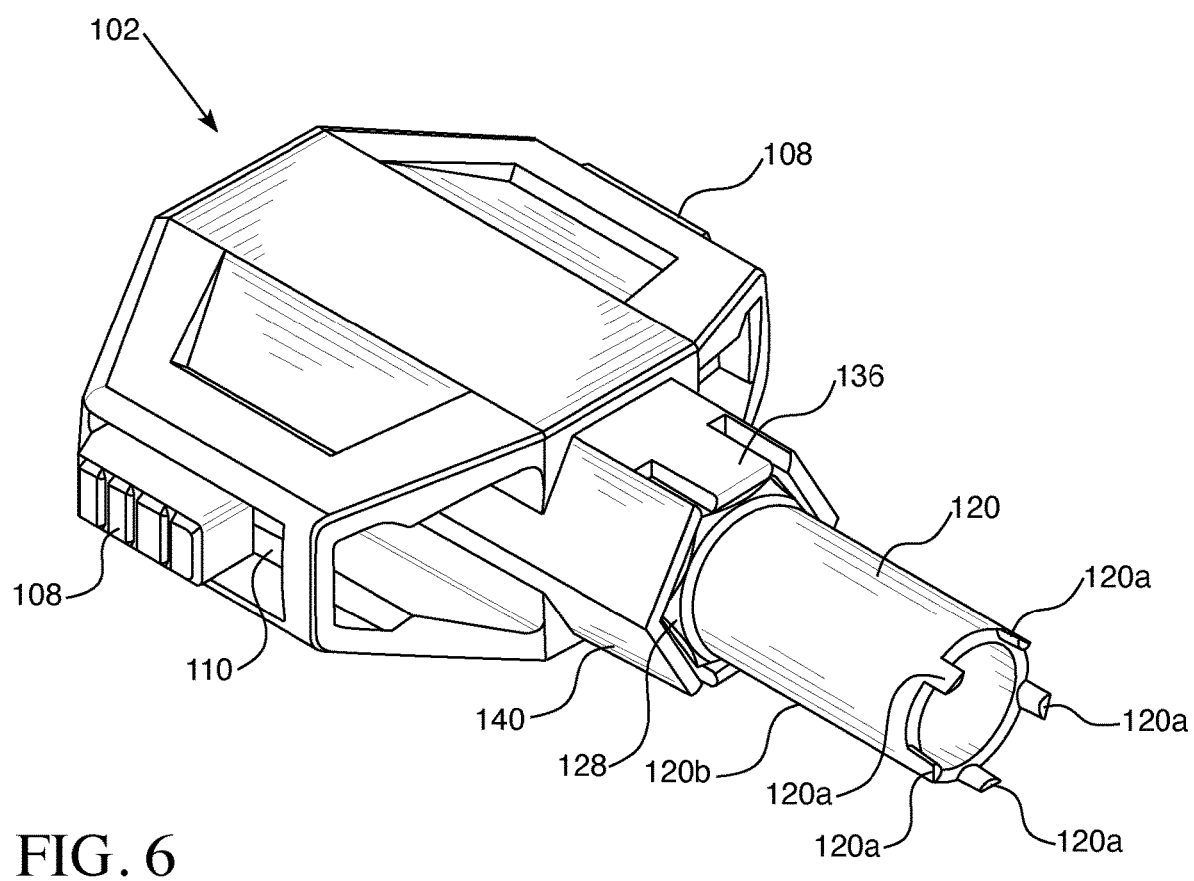
FIG. 6 is a perspective view of the handle and adjuster tool combined.
Figure 7:
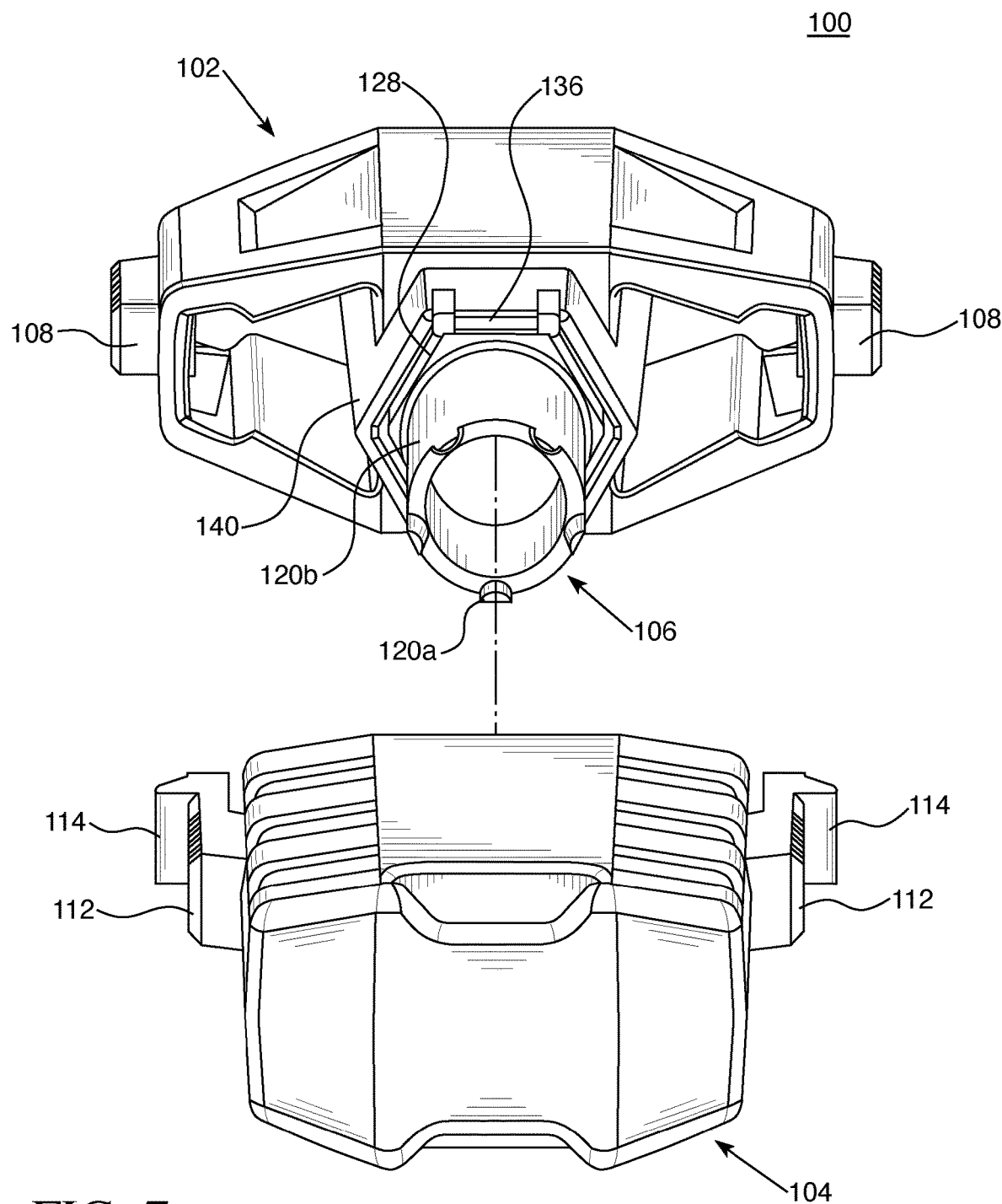
FIG. 7 is perspective front view of the adjustment tool assembly with the cover removed.
Figure 8:
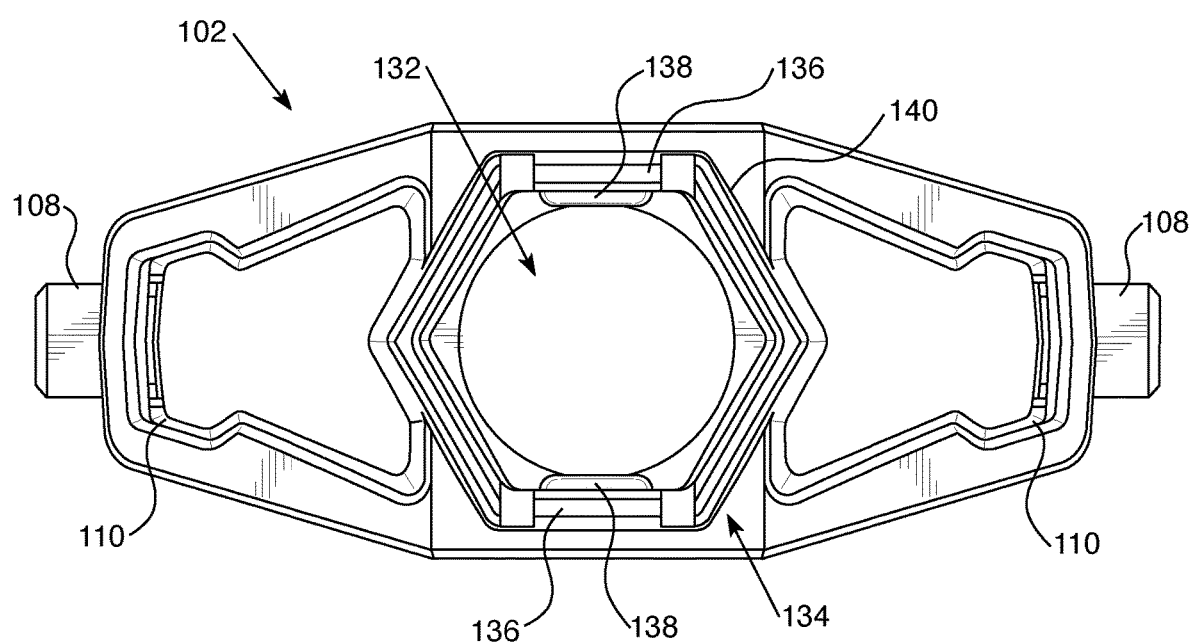
FIG. 8 is front view of the handle of the handle.

FIGS. 1-8 illustrate various views of an example of an adjustment tool assembly according to the present disclosure. FIG. 1 is a perspective view of a housing of an adjustment tool assembly. FIG. 2 is a cross-section view taken from line 2-2 of FIG. 1 that illustrates how the double-sided adjuster tool can be stored inside the housing. FIG. 3 is an exploded, top, perspective view of the adjustment tool assembly. FIG. 4 is an exploded, bottom, perspective view of the adjustment tool assembly. FIG. 5 is an exploded, top view of the adjustment tool assembly. FIG. 6 is a perspective view of the handle and adjuster tool combined. FIG. 7 is perspective front view of the adjustment tool assembly with the cover removed. FIG. 8 is front view of the handle of the adjustment tool assembly.

As mentioned above, the adjustment tool assembly 100 can include a double-sided adjuster tool 106. Generally, the double-sided adjuster tool 106 can have two tools 118, 120 on its ends and a middle portion, and at least one of the tools 118, 120 can include sight adjuster prongs. The double-sided adjuster tool 106 can be roughly cylindrical with a longer length compared to its diameter. It can be comprised of a rigid material such as, but not limited to, steel (for example, stainless steel or carbon steel), aluminum, titanium, various polymers, or combinations thereof, and can have a coating such as, but not limited to, a black oxide coating. One or more portions of the double-sided adjuster tool 106 can have a textured surface (such as knurling) to assist with non-slip leverage.

As illustrated in FIGS. 3-5, the double-sided adjuster tool 106 can be comprised of a tool 118, 120 at each of its ends and a middle portion positioned between each tool end. In some embodiments, at least one of the tools 118, 120 can have sight adjuster prongs. For example, at least one tool of the adjuster tool can be comprised of an A1 adjuster having five prongs. Alternatively, at least one tool of the adjuster tool can be comprised of an A2 adjuster having four prongs. As illustrated herein, some embodiments of the double-sided adjuster tool 106 can include a first tool 118 comprising an A2 adjuster with four prongs 118a, and a second tool 120 having an A1 adjuster with five prongs 120a. Other tools can be present on the ends of the double-sided adjuster tool such as, but not limited to, bit holders, other bit tips (for example, a Phillips bit, a flat bit, a hex bit, and a torx bit), an AK front sight adjuster, an SKS front sight adjuster, an UZI front sight adjuster, a Glock front sight adjuster, various punch sizes, and combinations thereof.

In addition to a tool 118, 120 (such as an A1 or A2 sight adjuster), each of the tool ends can include a shaft 118b, 120b that extends from the tools toward a middle portion of the double-sided adjuster tool 106 such that the first and second tools each have an adjacent shaft. Therefore, the shaft 118b, 120b of each tool end can be adjacent to the corresponding tools 118, 120, and the middle portion can be positioned between the two shafts. The shafts 118b, 120b can be cylindrical (although other shapes such as, but not limited to, pentagonal, hexagonal, septagonal, octagonal, etc., are possible) and can be hollow, partially hollow (for example, the portion nearest the tool end can be hollow with the remaining portion solid), or completely solid. As explained further below, the double-sided adjuster tool 106 can be paired with a handle 102 of the housing. In cases where the shafts of the double-sided adjuster tool are what secure the double-sided adjuster tool to the handle, the shafts of the two tool ends can have the same diameters so that either end can be paired with the handle. In other cases, the middle portion of the double-sided adjuster tool can be what secures the double-sided adjuster tool 106 to the handle 102, and, in those cases, the diameter of the shafts 118b, 120b is not important to the pairing mechanism, and they can, therefore, have different or similar diameters.

Between the two tool ends of the double-sided adjuster tool 106 can be a middle portion. In some embodiments, the middle portion of the double-sided adjuster tool 106 can include a central tool shaft 122, two channels 126, 130 (i.e., one near the shaft of each tool end), and two stoppers 124, 128. The stoppers 124, 128 can be located between each corresponding tool shaft 118b, 120b and each corresponding channel 126, 130. Therefore, the double-sided adjuster tool 106 can have a first tool 118 that includes a first tool end (for example, prongs 118a) of the double-sided adjuster tool, a first tool shaft 118b adjacent to the first tool end, a first stopper 124 adjacent the first tool shaft, and a first channel 126 between the first stopper and the central tool shaft 122. A second tool 120 of the double-sided adjuster tool 106 can mirror the first tool 118 such that the second tool includes a second tool end (for example, prongs 120a) on a second end of the double-sided adjuster tool, a second tool shaft 120b adjacent to the second tool end, a second stopper 128 adjacent the second tool shaft, and a second channel 130 between the second stopper and the central tool shaft 122.

As mentioned above, the central tool shaft 122 can pair with the handle 102 of the housing. In some embodiments, and as illustrated in FIGS. 3-5, the central tool shaft 122 and, therefore, the receiving cavity 132 of the handle 102 can be similarly sized and can be hexagonal. The central tool shaft can be hollow or, as illustrated in FIG. 2, the central tool shaft 122 can be solid. In embodiments where the central tool shaft 122 pairs with the handle 102, the length of each tool 118, 120 (including the tool end and the shaft) can be of a length that is approximately similar to the length of the handle, including the receiving cavity 132. This can enable the central tool shaft 122 to align with the receiving cavity 132 of the handle 102 and leave the tool that is opposite the handle-side exposed for use.

As mentioned further below, the receiving cavity 132 of the handle 102 can have distally extending sides 140 with tabs 136 that have dimples 138, wherein the dimples are on a distal end of the handle (for example, near an end of an exposed tab of the receiving cavity). In some embodiments, the handle-side tool 118 or 120, stopper 124 or 128, and channel 126 or 130 can, in combination with the central tool shaft 122, have a length equal to the length of the handle 102 from its proximal end out to the dimples 138 on the distal end of the receiving cavity 132 (including any of its distally extended sides 140). Therefore, the handle-side tool 118 or 120, stopper 124 or 128, and channel 126 or 130 can, in combination with the central tool shaft 122 all fit within the handle 102 (for example, in the receiving cavity 132 of the handle). This enables the dimples 138 to insert into the channel 126 or 130 of the double-sided adjuster tool end that is opposite the handle 102 and helps retain the double-sided adjuster tool 106 in the handle when the adjustment tool assembly 100 is in use.

To accommodate the dimples 138 and secure the double-sided adjuster tool 106 to the handle 102, the channels 126, 130 can have a smaller radius than the central tool shaft 122 and the stoppers 124, 128. Therefore, the dimples 138 can latch over an edge of the central tool shaft 122 and lodge within a channel 126 or 130. As mentioned above, the channels 126, 130 can be near the shafts 118b, 120b of each tool 118, 120 and can also be near each end of the central, hexagonal tool shaft 122. For example, the channels 126, 130 can be located between the stoppers 124, 128 and the central tool shaft 122. As illustrated in FIG. 5, the channels 126, 130 may be cylindrical and may have a length smaller than some or all of the other components (ex: central tool shaft, stopper, tool shaft, tool). However, the channel(s) could take any other shape (ex: pentagonal, hexagonal, septagonal, octagonal, etc.).

As mentioned above, the stoppers 124, 128 can be used to assist with proper retention of the double-sided adjuster tool 106 within the receiving cavity 132 of the handle 102. Specifically, as illustrated in FIG. 2, the channels 126, 130 can be placed between the central tool shaft 122 and the stoppers 124, 128 such that when the double-sided adjuster tool 106 is inserted into the receiving cavity 132, the dimples 138 lodge into the distal channel 126 or 130 and the stopper 124 or 128 is positioned more distally than that channel. This positioning of the stopper 124, 128 can prevent the double-sided adjuster tool 106 from sliding further into the receiving cavity 132 and can ensure that the appropriate amount of shaft 118b, 120b and tool 118a, 120a remain exposed for use, as illustrated in FIG. 6.

Since the double-sided adjuster tool 106 is reversible when combined with the handle 102, both stoppers 124, 128 may, at any time, be located within the handle. Therefore, if the receiving cavity 132 and central tool shaft 122 share a similar shape for compatibility purposes (for example, if they are hexagonal as illustrated herein), the stoppers 124, 128 can also share that same shape (i.e., both stoppers can also be hexagonal). As illustrated in FIG. 5, the stoppers 124, 128 can be sloped, beveled or otherwise angled from one end to the other. More specifically, the end of the stopper 124, 128 that is nearest the tool shaft 118b, 120b can have a smaller circumference compared to an end of the stopper that is nearest the channel 126, 130, and the portion between those two ends can be curved or linear. Further, in some embodiments, the side of the stoppers 124, 128 closer to the central tool shaft 122 can have a similar diameter compared to the central tool shaft, and the side of the stoppers closer to their corresponding tool shafts 118b, 120b can have a similar diameter compared to the tool shafts. Additionally, the channel-side faces of the stoppers 124, 128 can be flat. In some cases, the channel-side faces of the central tool shaft 122 can also be flat.

As illustrated in FIG. 2, and mentioned throughout this disclosure, the double-sided adjuster tool 106 can be stored inside a housing 102. Therefore, in addition to a double-sided adjuster tool 106, the adjustment tool assembly 100 can include a housing. The housing can further be comprised of a handle 102 and a cover 104. The handle 102 can have relatively broad top and bottom faces that are wider than the handle is tall, as illustrated in FIGS. 3-4. In some embodiments, the handle 102 has a similar length compared to its width, and its top and bottom faces can be approximately octagonal, as illustrated in FIG. 5. However, this is not limiting, and the handle may be hexagonal, pentagonal, square, round, etc. The handle 102 can have a receiving cavity 132 on a distal end that is structured and configured to receive the middle portion of the double-sided adjuster tool 106. The cover 104 can be approximately rectangular such that it has a longer length than its width, as illustrated in FIG. 5. It can have a similar width and height compared to the handle 102, as illustrated in FIG. 1. The handle 102 and cover 104 can be comprised of the same material (or combination of materials) such as, but not limited to, nylon, acrylonitrile butadiene styrene (ABS), polypropylene (PP), polycarbonate (PC), and combinations thereof. In some cases, portions of the handle 102 and cover 104 may be made from a first material whereas other portions made be made from a second material. For example, the flexible tabs 136 of the handle 102 could be made from a polymer while the remainder of the handle could be comprised of a metal. Similarly, the fingers 112 of the cover 104 could be made from a polymer while the main body of the cover 104 could be comprised of a metal. The material can allow for some flexibility of the various components of the housing. For example, the flexible tabs 136 of the handle 102 and the flexible fingers 112 of the cover 104 can include living hinges.

In some embodiments, as mentioned above, the distal end of the handle 102 can receive at least a portion of the double-sided adjuster tool 106 in a receiving cavity 132 such that at least one end of the adjuster tool can extend out from the receiving cavity. To retain the two components together, the receiving cavity 132 may include a distal, open end 134 and flexible tabs 136 that have dimples 138. The dimples 138 may be configured to interact with a channel 126, 130 (of which there may be two) in a middle portion of the adjuster tool 106. Additionally, the cover 104 can connect to the handle 102. More specifically, to retain the handle 102 and the cover 104 together, the handle may include opening(s) 110 in its outer wall(s) 108 that can receive notch(es) 114 of the flexible finger(s) 112 of the cover 104. The notch(es) 114 can penetrate through at least a portion of the opening(s) 110 in outer wall(s) 108 such that opposing pulling forces that are applied between the handle 102 and the cover 104 do not result in separation of the handle and the cover. Separation can occur when the flexible finger(s) 112 are pushed inward toward a central axis of the cover 104 and the notch(es) 114 are no longer partially within the opening(s) 110. At that point in time, the handle 102 and the cover 104 can be pulled apart, leaving the double-sided adjuster tool 106 ready for use in the handle. Further details of the handle and cover are provided below.

As illustrated in FIG. 3, the housing can include a handle 102 and a receiving cavity 132. The receiving cavity 132 can be in the handle 102 (for example, it can be located along a central axis that runs from the proximal end of the handle to the distal end of the handle) and can receive at least a portion of the double-sided adjuster tool 106. More specifically, the middle portion of the double-sided adjuster tool 106 can engage with the receiving cavity 132 to secure the adjuster tool to the handle 102. For example, as described in detail above, both the receiving cavity 132 and the middle portion (for example, the central tool shaft 122) can be hexagonal in shape to enable the double-sided adjuster tool 106 to slide into the receiving cavity and prevent the double-sided adjuster tool from spinning and/or rotating while in use. Additional structure for retaining the adjuster tool in the receiving cavity, such as flexible tabs having inwardly facing dimples, can also be present.

More specifically, as illustrated in FIG. 3, a distal, open end 134 of the receiving cavity 132 can include two flexible tabs 136 and a dimple 138 located on each tab near the distal end of the tab. The tabs 136 can be on opposing sides of the receiving cavity 132. For example, in embodiments where the receiving cavity 132 is hexagonal, two of the sides can be positioned on a top and a bottom of the receiving cavity such that the top and bottom of the receiving cavity are flat surfaces. The tabs 136 can be located on these two sides that are positioned on the top and bottom. Therefore, the tabs 136 can also be on a top and bottom of the receiving cavity 132. As illustrated herein, the tabs 136 may be defined by slots or openings in the top and bottom sides of the receiving cavity 132. For example, the distal end of the top side of the receiving cavity 132 can have a first slot near one of its edges and a second slot near its opposite edge. The material between those two slots can define the tab 136 and can function as a living hinge. Similarly, the distal end of the bottom side of the receiving cavity 132 can have a first slot near one of its edges and a second slot near its opposite edge. The material between those two slots can define the second tab 136 and can function as a living hinge.

On an interior surface of those tabs 136 can be the dimples 138, and the dimples can face each other, as illustrated in FIG. 8. The dimples 138 can be located near a distal end of the tabs 136, as illustrated in FIG. 3, and can be rounded mounds that protrude into the hollow, open end 134 of the receiving cavity 132. As illustrated in FIG. 3, they can take the shape of an approximate half-cylinder. However, they may also take different shapes such as, but not limited to, a half-circle. As mentioned above, the dimples 138 are configured to interact with the double-sided adjuster tool 106 (for example, a channel 126, 130 of the middle portion of the adjuster tool) to secure the adjuster tool to the handle 102. The channel 126 or 130 that interacts with the dimples 138 can be nearer to the tool 118 or 120 that is protruding out of the handle 102 than to the tool 118 or 120 that is paired with the receiving cavity 132. Therefore, when the double-sided adjuster tool 106 is inserted into the receiving cavity 132 of the handle 102, the dimples 138 can make contact with the proximal tool 118a or 120a and tool shaft 118b or 120b and, due to the structure and configuration of the tabs 136, can cause the tabs to flex outward. As the adjuster tool 106 continues to slide into the receiving cavity 132, the dimples 138 can continue to slide over the proximal channel 126 or 130 and stopper 124 or 128 as well as the central tool shaft 122. Once the dimples 138 reach the distal channel 126 or 130, they can insert into that channel and the distal stopper 124 or 128 can prevent the double-sided adjuster tool 106 from sliding any further into the receiving cavity 132 of the handle 102. In this form, a user now has a much more manageable grip on the adjustment tool assembly and can manipulate the tool with more control and comfort.

As mentioned above, in addition to the handle 102, the housing can also include a cover 104 configured to connect to the handle. The handle 102 and the cover 104 can completely encase the double-sided adjuster tool 106, as illustrated in FIGS. 1 and 2. In some embodiments, the handle 102 can have a side wall on each of its right and left sides that includes an opening 110. More specifically, the side walls can be approximately rectangular and can include an outer wall 108 and an opening 110 within a rectangular frame. The outer wall 108 can protrude out from the frame and can include additional texture such as, but not limited to, ribbing, knurling, etc. The opening 110 can be positioned distally from the outer wall 108 and can simply be a pass-through into a hollow portion of the handle 102 that flanks the receiving cavity. More specifically, the handle 102 can include additional openings on its distal end that flank the receiving cavity 132, as illustrated in FIGS. 3 and 6-8. These openings can be shaped to receive a portion of the cover 104.

More specifically, the cover 104 can include flexible fingers 112 that protrude outward (for example, proximally and from the side, as illustrated in FIGS. 5 and 7) from a main body and align inside the side walls of the handle 102, as illustrated in FIG. 1. Each finger 112 can have a proximal portion that extends away from the main body of the cover and a distal portion that is more substantially supported by the main body. This configuration allows the proximal portion of the fingers 112 to flex inward toward a central axis of the cover 104.

The proximal portion of each finger 112 can also have a notch 114 on the outer edge that protrudes even further out from the side, and the notches can be configured to fit through the openings 110 of the side walls to secure the cover 104 to the handle 102. More specifically, the notches 114 can be sloped by having a proximal end with a similar width as the distal portion of the fingers 112 and a distal end that protrudes out further from the outer face of the distal portions of the fingers and is, therefore, wider than the distal portions of the fingers. The distal end of the notches 114 can then have flat faces that are perpendicular to the relatively flat face of the distal portion of the fingers 112. The distal, flat face of the notch 114 is what can hook onto the opening 110 in the handle 102 and prevent the handle and cover 104 from spontaneously separating.

While the distal portion of the fingers 112 are relatively flat, they can have a textured surface such as, but not limited to, ribbing, knurling, etc., that corresponds to the texture on the outer wall 108 of the handle 102. Therefore, when the cover 104 and the handle 102 are attached to one another, the distal portion of the fingers 112 can act as a base for the proximal, flexible portion of the fingers as well as a gripping point for the user, and the proximal, flexible portion of the fingers can insert into the distal opening 110 of the handle 102 and can secure the cover 104 to the handle by allowing the notches 114 to move from the flanking cavities inside the handle out through the openings in the sides of the handle.

In addition to the fingers 112, the cover 104 can also include a central chamber in the main body of the cover that is shaped to fit the extended sides 140 of the receiving cavity 132 and double-sided adjuster tool 106. Therefore, if the receiving cavity 132 and double-sided adjuster tool 106 are hexagonally shaped, the central chamber of the cover 104 can also be hexagonally shaped, as illustrated in FIG. 4. Lastly, in some embodiments, the cover 104 may include a hole 116 in its distal end. The hole 116 can simply be used for securing or hanging the adjustment tool assembly 100 to another surface or object.

Therefore, as mentioned herein, the adjustment tool assembly 100 can be comprised of a housing and a double-sided adjuster tool 106. The housing can further be comprised of a handle 102 and a cover 104. In some embodiments, the handle 102 can receive at least a portion of the adjuster tool 106 in the receiving cavity 132 such that at least one end of the adjuster tool 106 extends out from the receiving cavity 132. To retain the two components together, the receiving cavity 132 may include a distal, open end 134 and flexible tabs 136 having dimples 138, and the dimples 138 may be configured to interact with a channel 126 or 130 in a middle portion of the adjuster tool 106. Further, the cover 104 can connect to the handle 102, as illustrated in FIG. 1. More specifically, to retain the handle 102 and the cover 104 together, the handle may include opening(s) 110 near its outer wall(s) 108 that can receive notch(es) 114 of flexible finger(s) 112 of the cover 104. the notch(es) 114 can penetrate through at least a portion of the opening(s) 110 such that opposing pulling forces applied between the handle 102 and the cover 104 does not result in separation of the handle 102 and the cover 104. Separation can occur when the flexible finger(s) 112 are pushed inward toward a central axis of the cover 104 and the notch(es) 114 are no longer partially within the opening(s) 110.

In use, to assemble the disclosed adjustment tool assembly 100, a user can insert a double-sided adjuster tool 106 into a receiving cavity 132 of a handle 102 and secure a cover 104 to the handle 102 using a snap-fit connection. The handle 102 can have a side wall on each of its right and left sides that includes an opening 110, the cover 102 can have flexible fingers 112 that align inside the side walls of the handle 102, each flexible finger 112 can have a notch 114 on its outer edge, and the notches 114 can be configured to fit through the opening 110 of the side walls to secure the cover 104 to the handle 102. To disassemble the disclosed adjustment tool assembly 100, the user can take the assembled adjustment tool assembly 100, push the notches 114 inward toward the receiving cavity 132 of the handle 102, thereby causing the flexible fingers 112 to flex, and remove the cover 104 from the handle 102.

The various embodiments described above are provided by way of illustration only and should not be construed to limit the claims attached hereto. Those skilled in the art will readily recognize various modifications and changes that may be made without following the example embodiments and applications illustrated and described herein and without departing from the true spirit and scope of the following claims.

What is claimed is:

1. An adjustment tool assembly, the adjustment tool assembly comprising:
   a double-sided adjuster tool, wherein
      each end is comprised of a tool,
      each tool end has a shaft,
      a middle portion is positioned between the shaft of each tool end, and
      the middle portion is comprised of a raised stopper that is adjacent to an end of each tool shaft; and
   a housing having a handle, wherein
      the handle has a receiving cavity for at least a portion of the double-sided adjuster tool, and
      the middle portion of the adjuster tool engages with the receiving cavity to secure the adjuster tool to the handle.

2. The adjustment tool assembly of claim 1, wherein the at least one tool end of the adjuster tool is comprised of an A1 adjuster having five prongs or an A2 adjuster having four prongs.

3. The adjustment tool assembly of claim 1, wherein the middle portion is comprised of
   a central, hexagonal tool shaft, and
   a channel on each end of the central, hexagonal tool shaft, wherein each stopper is positioned between each shaft and each channel.

4. The adjustment tool assembly of claim 1, wherein the receiving cavity has a distal, open end with two flexible tabs, wherein
   each tab has a protrusion near the distal end of the tab, and
   the protrusions are configured to interact with a channel in the middle portion of the adjuster tool to secure the adjuster tool to the handle.

5. The adjustment tool assembly of claim 4, wherein the middle portion has a channel near the shaft of each tool end, and the protrusions are configured to interact with the channel near the tool end that is protruding out of the handle.

6. The adjustment tool assembly of claim 4, wherein the tabs are on opposing sides of the receiving cavity.

7. The adjustment tool assembly of claim 6, wherein the tabs are on a top and bottom of the receiving cavity.

8. The adjustment tool assembly of claim 4, wherein the middle portion is comprised of a central, hexagonal tool shaft and the receiving cavity is correspondingly hexagonal in shape.

9. The adjustment tool assembly of claim 1, wherein the raised stopper of the middle portion of the adjuster tool engages with the receiving cavity to assist with securing the adjuster tool to the handle.

10. An adjustment tool assembly comprising:
    a double-sided adjuster tool, wherein
       each end is comprised of a tool, and
       a middle portion is positioned between a shaft of each tool end; and
    a housing comprised of a handle and a cover, wherein
       the handle has a receiving cavity for at least a portion of the double-sided adjuster tool,
       the middle portion of the adjuster tool engages with the receiving cavity to secure the adjuster tool to the handle,
       the cover has a snap-fit connection to the handle, and
       the handle and cover completely encase the double-sided adjuster tool when connected.

11. The adjustment tool assembly of claim 10, wherein the handle has a right side with a side wall and a left side with a side wall, and each side wall includes an opening.

12. The adjustment tool assembly of claim 11, wherein the cover has flexible fingers that align inside the side walls of the handle.

13. The adjustment tool assembly of claim 12, wherein each finger has a protrusion on its outer edge.

14. The adjustment tool assembly of claim 13, wherein the protrusions are configured to fit through the openings of the side walls to secure the cover to the handle.

15. An adjustment tool assembly, the adjustment tool assembly comprising:
    a double-sided adjuster tool, wherein
       each end is comprised of a tool,
       the first and second tool ends both have an adjacent shaft,
       a middle portion is positioned between the shaft of each tool end, and
       the middle portion is comprised of a central tool shaft,
a channel on each end of the central tool shaft, and
a stopper between each adjacent shaft and each channel; and a housing having
a handle,
a receiving cavity for at least a portion of the double-sided adjuster tool, wherein the receiving cavity has a distal, open end with two flexible tabs,
a protrusion is located on each flexible tab near the distal end of the flexible tab, and
the protrusions are configured to interact with one of the channels of the middle portion of the adjuster tool to secure the adjuster tool to the handle, and
a cover configured to connect to the handle,
wherein the handle and cover completely encase the double-sided adjuster tool.

16. The adjustment tool assembly of claim 15, wherein
the first tool end of the adjuster tool is comprised of an A2 adjuster having four prongs, and
the second tool end of the adjuster tool is comprised of an A1 adjuster having five prongs.

17. The adjustment tool assembly of claim 15, wherein
the handle has a right side and a left side,
the handle has a side wall on each of the right and left sides that includes an opening,
the cover has flexible fingers that align inside the side walls of the handle,
each flexible finger has an outer edge and a protrusion on the outer edge, and
the protrusions are configured to fit through the opening of the side walls to secure the cover to the handle.

18. A method of assembling an adjustment tool assembly, the method comprising
inserting a double-sided adjuster tool into a receiving cavity of a handle; and
securing a cover to the handle using a snap-fit connection, wherein
a middle portion of the adjuster tool engages with the receiving cavity to secure the adjuster tool to the handle, and
the handle and the cover completely encase the double-sided adjuster tool when connected to each other.

19. The method of claim 18, wherein
the handle has a right side and a left side,
the handle has a side wall on each of the right and left sides that includes an opening,
the cover has flexible fingers that align inside the side walls of the handle,
each flexible finger has an outer edge and a protrusion on the outer edge, and
the protrusions are configured to fit through the opening of the side walls to secure the cover to the handle.

20. The method of claim 19, further comprising
pushing the protrusions inward toward receiving cavity of the handle, thereby causing the flexible fingers to flex; and
removing the cover from the handle.

* * * * *